United States Patent
Tiras

(10) Patent No.: US 8,682,149 B2
(45) Date of Patent: Mar. 25, 2014

(54) FLOW MEASUREMENT WITH ELECTRIC HEATERS

(75) Inventor: Craig S. Tiras, Houston, TX (US)

(73) Assignee: Gaumer Company, Inc., Houston, TX (US)

( * ) Notice: Subject to any disclaimer, the term of this patent is extended or adjusted under 35 U.S.C. 154(b) by 1161 days.

(21) Appl. No.: 12/622,127

(22) Filed: Nov. 19, 2009

(65) Prior Publication Data

US 2011/0116777 A1   May 19, 2011

(51) Int. Cl.
 *H05B 3/40* (2006.01)
(52) U.S. Cl.
 USPC .................. 392/497; 392/465; 392/466
(58) Field of Classification Search
 None
 See application file for complete search history.

(56) References Cited

U.S. PATENT DOCUMENTS

| | | | |
|---|---|---|---|
| 3,726,713 A | 4/1973 | Hawk et al. | |
| 3,871,734 A | 3/1975 | Murtland | |
| 4,618,266 A * | 10/1986 | Feller | 374/41 |
| 4,781,607 A | 11/1988 | Rumbaugh | |
| 4,895,528 A | 1/1990 | Choiniere et al. | |
| 5,070,940 A | 12/1991 | Conner et al. | |
| 5,259,243 A * | 11/1993 | Drexel et al. | 73/204.25 |
| 5,396,574 A | 3/1995 | Base et al. | |
| 5,577,925 A | 11/1996 | Schnatzmeyer et al. | |
| 5,944,048 A * | 8/1999 | Bump et al. | 137/487.5 |
| 5,975,126 A * | 11/1999 | Bump et al. | 137/487.5 |
| 6,145,597 A | 11/2000 | Kobylinski | |
| 6,487,904 B1 * | 12/2002 | Myhre | 73/204.12 |
| 6,712,084 B2 * | 3/2004 | Shajii et al. | 137/12 |
| 6,868,862 B2 * | 3/2005 | Shajii et al. | 137/487.5 |
| 6,948,362 B2 * | 9/2005 | Gralenski | 73/204.23 |
| 6,994,589 B2 | 2/2006 | Schliese | |
| 7,204,724 B2 | 4/2007 | Holtz | |
| 7,243,035 B2 * | 7/2007 | Tison et al. | 702/100 |
| 7,831,399 B2 * | 11/2010 | Schrittenlacher | 702/55 |
| 8,235,589 B1 * | 8/2012 | Feller | 374/39 |
| 2008/0289411 A1 * | 11/2008 | Schrag et al. | 73/204.11 |

* cited by examiner

*Primary Examiner* — Thor Campbell
(74) *Attorney, Agent, or Firm* — Bracewell & Giuliani LLP

(57) ABSTRACT

An apparatus and method for heating fluidic materials.

14 Claims, 7 Drawing Sheets

FLOW MEASUREMENT WITH ELECTRIC HEATERS

FIELD OF THE INVENTION

This invention relates in general to an apparatus for heating a fluidic material.

BACKGROUND OF THE INVENTION

Circulation heaters typically include one or more heating elements that are immersed in and in direct contact with the fluidic material to be heated. Circulation heaters may be used to heat fluidic materials, such as, for example, a feed gas for use in a gas turbine. Such systems are commonly referred to as feed gas conditioning systems and are normally operated to supply the gas turbine with a dry gas that is superheated a selected level above its due point. The super heat avoids any liquids in the gas condensing as the temperature drops.

DETAILED DESCRIPTION OF THE INVENTION

Figure 1:
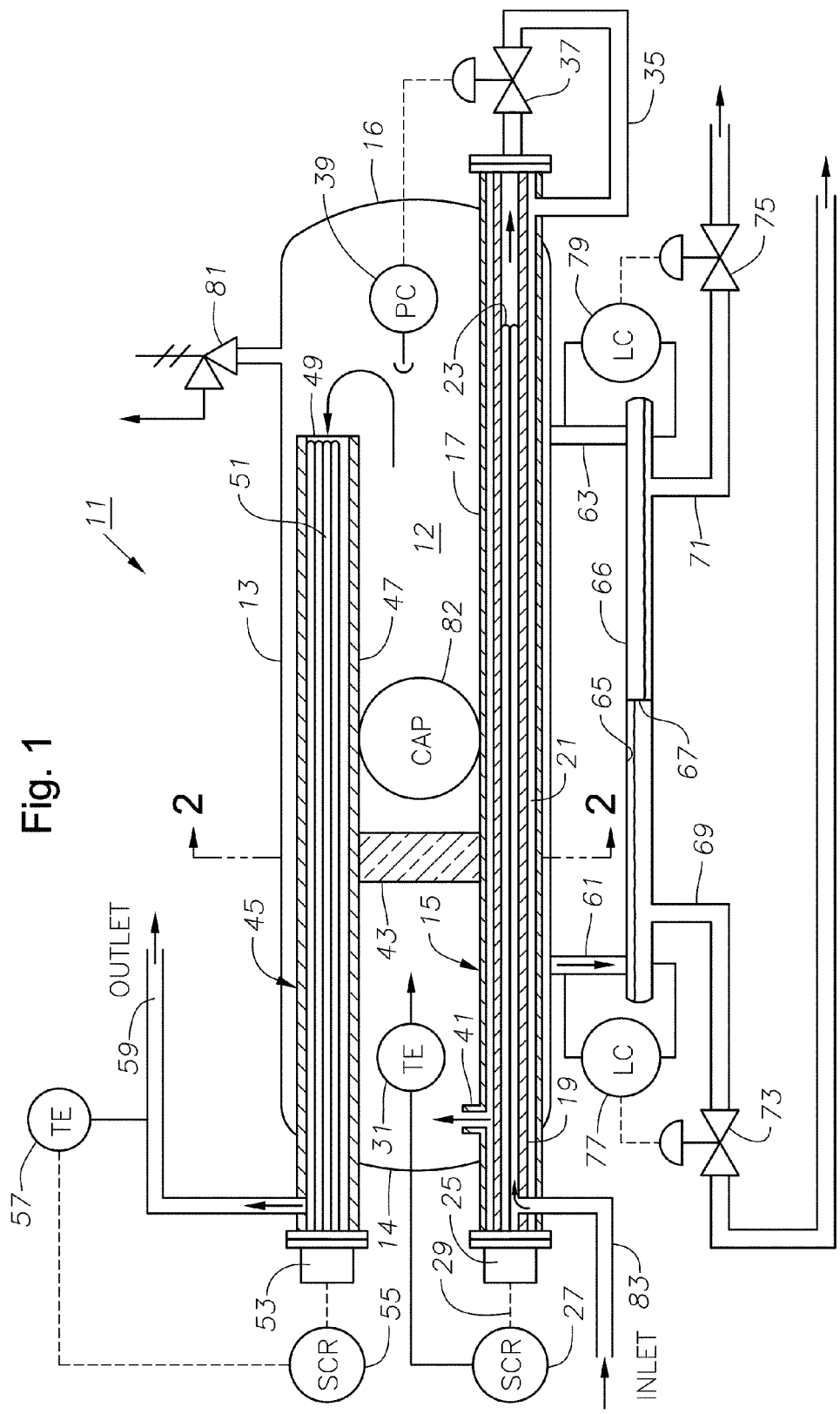
FIG. 1 is a schematic sectional view of an exemplary embodiment of a fuel gas conditioning system.

Referring to FIG. 1, a fuel gas conditioning system 11 includes a pressure vessel 13 having an interior chamber 12. Pressure vessel 13 is preferably cylindrical and has two closed ends 14, 16. The length of pressure vessel 13 considerably greater than its diameter. In this example, the longitudinal axis of pressure vessel 13 is horizontal.

A pre-heater unit 15 is mounted in pressure vessel 13 with its axis parallel and offset from the longitudinal axis of pressure vessel 13. Pre-heater unit 15 has a length somewhat greater than the length of pressure vessel 13 in this example, with its ends protruding past ends 14, 16 of pressure vessel 13. Pre-heater unit 15 has an outer tubular housing 17 and a concentric inner tubular housing 19, defining an annulus 21 between housings 17, 19. A plurality of electrical heater elements 23 extend longitudinally within inner housing 19.

Heater elements 23 are conventional elements, each comprising a metal tube containing an electrical resistance wire electrically insulated from the tube. In this embodiment, heater elements 23 are U-shaped, each having its terminal ends mounted within a connector housing 25 located exterior of end 14 of pressure vessel 13. The bent portions of heater elements 23 are located near the opposite end of pre-heater unit 15. A power controller 27 supplies power via wires 29 to electrical heater elements 23. Power controller 27 varies the power in response to temperature sensed by a temperature sensor 31 that is located within chamber 12 in pressure vessel 13.

Pre-heater unit 15 has an inlet 33 that leads to the interior of inner housing 19 of pre-heater unit 15 in the portion of pre-heater unit 15 exterior of pressure vessel end 14. In the embodiment of FIG. 1, an external conduit loop 35 is located on the opposite end of pre-heater unit 15, exterior of pressure vessel end 16. External loop 35 leads from the interior of inner housing 19 to annulus 21. A variable expansion valve 37 is located in external loop 35 for reducing the pressure of the gas flowing through external loop 35, which also results in cooling of the gas. Expansion valve 37 varies the amount of pressure drop in response to a pressure sensor 39 located within pressure vessel chamber 12.

Annulus 21 has an outlet 41 located within pressure vessel chamber 12 near end 14. A mist or coalescing filter 43 is located within pressure vessel chamber 12 approximately halfway between ends 14, 16 of pressure vessel 13. Coalescing filter 43 collects liquid mist from the gas flowing from annulus outlet 41 towards the pressure vessel end 16.

A super-heater 45 is mounted in pressure vessel chamber 12. Super-heater 45 has an elongated tubular housing 47 that has an axis parallel with the axis of pre-heater unit 15 and offset from the axis of pressure vessel 13. Super-heater 45 is located above pre-heater unit 15 in this example and has a length that is less than the length of pre-heater unit 15. Super-heater 45 has an inlet 49 in housing 47, inlet 49 being within pressure vessel chamber 12 and closer to pressure vessel end 16 than end 14. Super-heater 45 has a plurality of electrical resistance heater elements 51 located within housing 47.

Electrical resistance heater elements 51 may be of the same type as electrical resistance heater elements 23 of pre-heater unit 15. Preferably, each is U-shaped with both of its terminal ends mounted within an a connector housing 53, which is external of end 14 of pressure vessel 13. A power controller 55 supplies power to electrical resistance heater elements 51. Power controller 55 controls the power in response to temperature sensed by a temperature sensor 57 located within an outlet 59 of super-heater 45. In this embodiment, outlet 59 leads from a portion of super-heater housing 47 that is external of pressure vessel 13.

Pressure vessel 13 has at least one drain 61 for draining liquid that condenses within chamber 13 upstream of filter 43 as a result of the pressure drop. A second drain 63 drains liquid that separates from the gas as a result of flowing through filter 43. Drains 61, 63 are located on opposite sides of filter 43 and lead downward from a lower point on the sidewall of pressure vessel 13. Each drain 61, 63 leads to a separate sump 65, 66. In this example, sumps 65, 66 are compartments of a single tubular pressure vessel and separated from each other by a sealed plate 67. Outlets 69, 71 lead from the bottom of sumps 65, 66 to liquid control valves 73, 75. Each liquid control valve 73, 75 has a level controller 77, 79, respectively. Level controllers 77, 79 are conventional devices to open valves 73, 75 when the levels of liquid within sumps 65, 66 reach a selected amount, so as to discharge the liquid from sumps 65, 66. Other automatic drain arrangements are feasible.

Pressure vessel 13 has a pressure relief valve 81 in communication with its chamber 12. Pressure relief valve 81 is a conventional device to relieve pressure in the event that it reaches an excessive amount. Preferably, pressure vessel 13 has an access port 82 with a removable cap. Access port 82 is located in its sidewall in this embodiment. Access port 82 is of a size selected to allow a worker to enter chamber 12 for maintenance, particularly for removing and installing coalescing filter 43, which must be done periodically.

Figure 2:
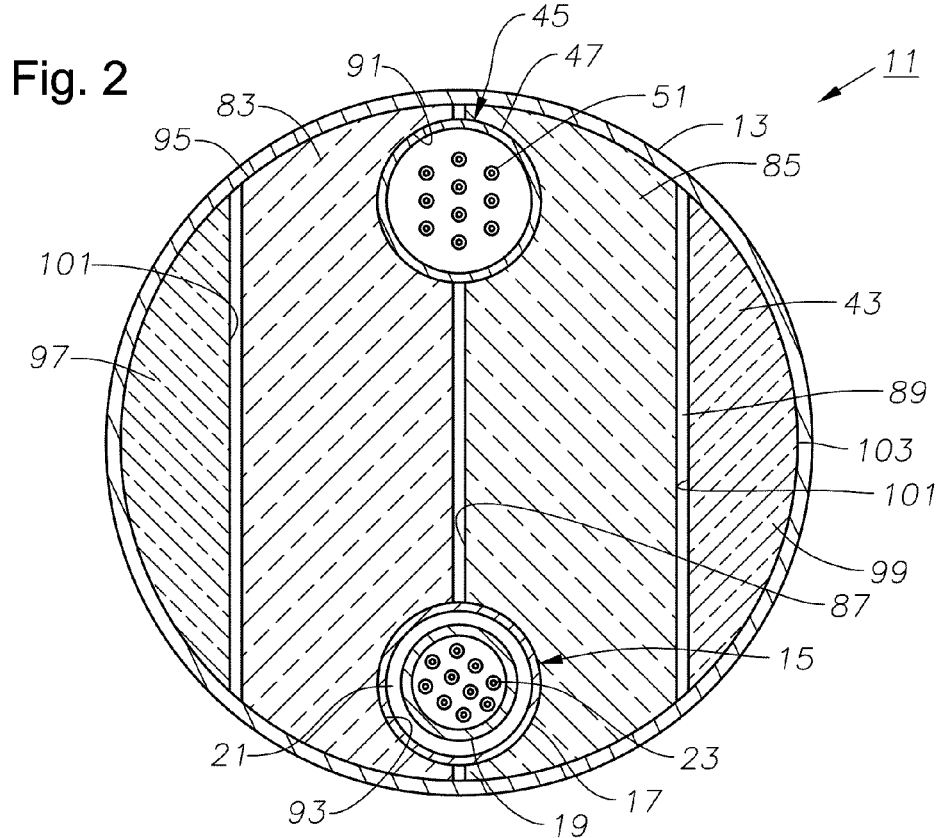
FIG. 2 is a sectional view of the fuel gas conditioning system of FIG. 1.

Referring to FIG. 2, coalescing filter 43 comprises an assembly of compressible pieces or segments that define an outer diameter that sealingly engages the inner diameter of pressure vessel 13. The multiple pieces of coalescing filter 43 are sized so that each will pass through access port 82 (FIG. 1). These pieces include in this example a pair of central segments 83, 85 having inner edges 87 and outer edges 89 that are straight and parallel with each other. Inner edges 87 sealingly abut each other. Each inner edge 87 has a semi-cylindrical recess 91 for engaging super-heater 45. Each inner edge 87 has a semi-cylindrical recess 93 for fitting around pre-heater unit 15. Each central segment 83, 85 has outer diameter portions 95 on opposite ends that are partially cylindrical and sealingly engage the inner diameter of pressure vessel 13.

Coalescing filter 43 also has two side segments 97, 99 in this embodiment. Each side segment 97, 99 has a straight inner edge 101 that abuts one of the outer edges 89 of one of the central segments 83, 85. Each side segment 97 has an outer diameter portion 103 that seals against the inner diameter of pressure vessel 13. Segments 83, 85, 97 and 99 are compressible so as to exert retentive forces against each other and against pressure vessel 13 to hold them in place. Retainers (not shown) may also be employed to hold the segments of coalescing filter 43 in position.

Fuel gas conditioning system 11 serves to condition fuel gas for gas turbines. Gas turbines, particularly low pollution types, require a dry feed gas that has a selected amount of superheat, such as 50 degrees above its dew point curve. The term "superheat" is a conventional industry term to refer to a range where the pressure and temperature of the fuel gas are above a range where condensation can occur. Referring to FIG. 1, feed gas enters inlet 49 at a pressure that may be, for example, 1,000 to 1,300 psig and at a temperature from 60-80 degrees F. The feed gas flows through inner housing 19 of pre-heater unit 15, which increases the temperature of the feed gas a selected amount over the temperature of the incoming gas. For example, the temperature may be approximately 100-120 degrees F. as it exits inner housing 19, and the pressure would be approximately the same as at inlet 49.

This preheated gas then flows through expansion valve 37, causing a pressure drop to a selected level below the dew point curve, as monitored by pressure sensor 39. For example, if the intake pressure is 1,000 to 1,300 psig, the pressure may drop to approximately 450-500 psig. The temperature will also drop to perhaps 60-80 degrees F., and at this temperature and pressure, the gas will be below its dew point curve. The lower pressure cooler gas flows back through annulus 21 in pre-heater unit 15, which adds additional heat. At annulus outlet 41, the pressure may still be around 450-550 psig and the temperature may be 70-100 degrees F., but still below the dew point. Controller 27 controls the power to heater elements 23 to maintain a desired temperature at outlet 41 as monitored by sensor 31.

Because the drop in pressure at expansion valve 37 caused the gas to be below its dew point, some of the liquids contained within the gas will condense in chamber 14 upstream of filter 43. Also, liquids will be separated from the gas by coalescing filter 43 as the gas flows through coalescing filter 43. The liquids collect on the bottom of pressure vessel 13 and flow through outlets 61, 63 into sumps 65, 66 and out through valves 73, 75.

After passing through filter 43, the gas flows toward pressure vessel end 16 and enters inlet 49 of super-heater 45. Electrical resistance heater elements 51 add heat to the dry gas in an amount that will place the temperature of the gas well above its dew point curve, such as by 50 degrees. The gas, now in a superheated condition, flows out outlet 59 at for example 110-130 degrees F. and 450-550 psig. The gas from outlet 59 flows into a conventional gas turbine (not shown).

Figure 3:
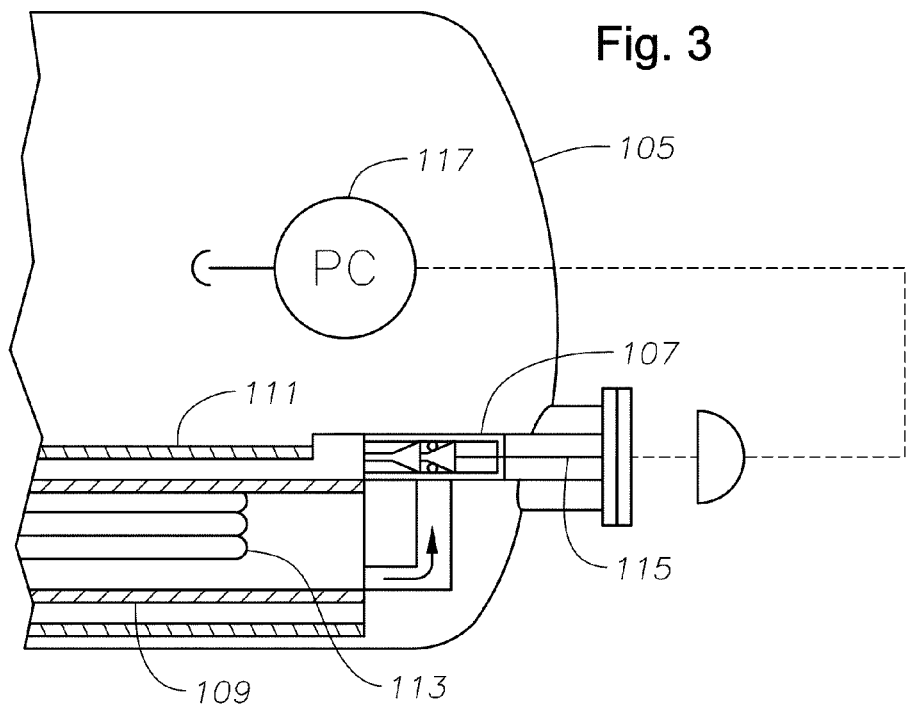
FIG. 3 is a sectional view of a portion of an alternate exemplary embodiment of a fuel gas conditioning system.

FIG. 3 shows a portion of an alternate embodiment wherein pressure vessel 105 contains an expansion valve 107 within its interior. In the first embodiment, expansion valve 37 is located on the exterior of pressure vessel 13. In FIG. 3, pre-heater inner housing 109 and outer housing 11 have one end within pressure vessel 105 instead of on the exterior as in the first embodiment. Heater elements 113 are contained within inner housing 109 as in the first embodiment. A valve actuator 115 controls the orifice of expansion valve 107. Valve actuator 115 varies the pressure drop in response to pressure sensed by a pressure sensor 117 located within the interior of pressure vessel 105. The second embodiment operates in the same manner as the first embodiment.

The gas conditioner is compact as the components are principally contained within a single pressure vessel. This arrangement reduces the amount of space required and the external flowlines connecting the various components.

Figure 4:
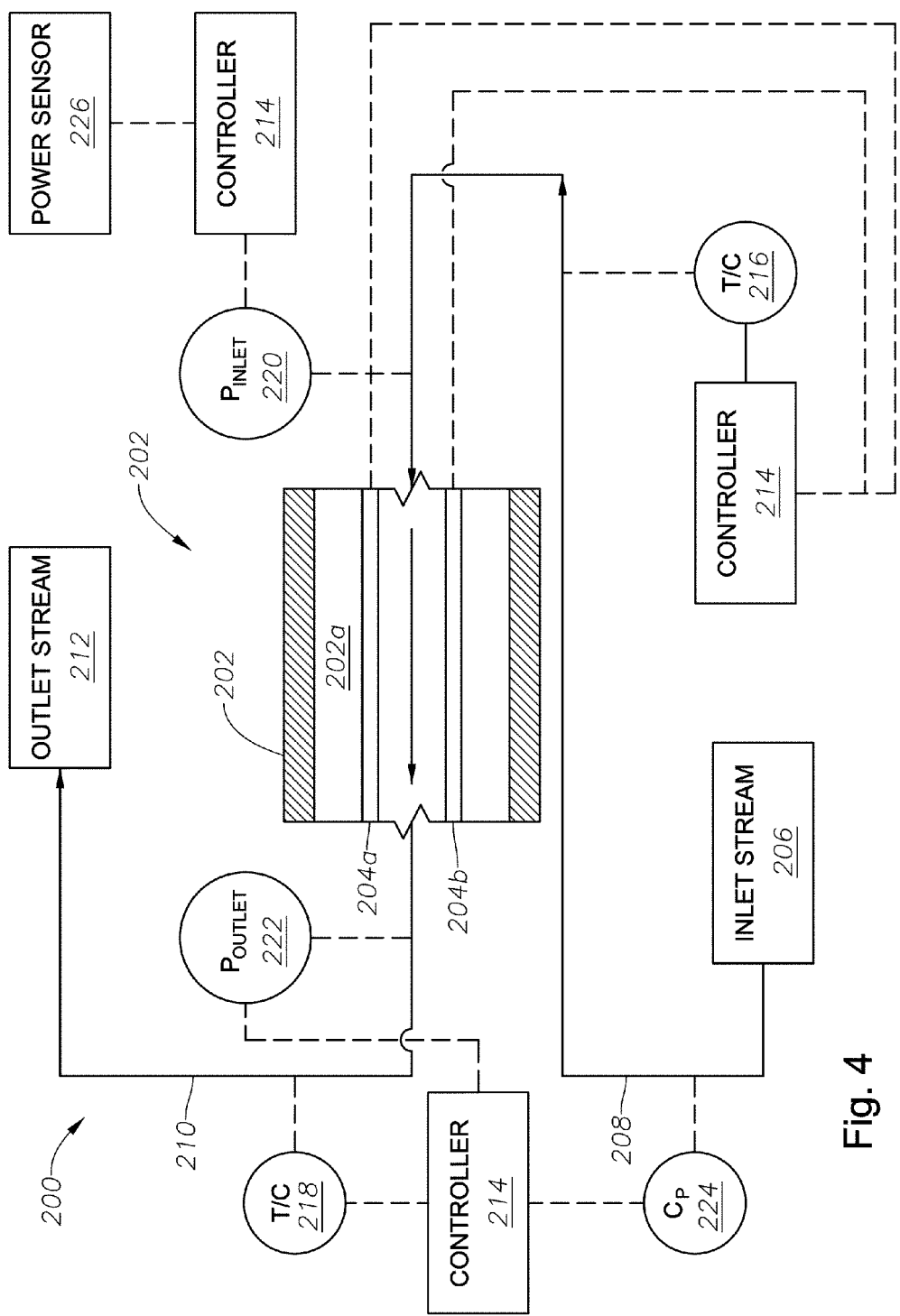
FIG. 4 is a fragmentary cross sectional and schematic illustration of an alternate exemplary embodiment of a fuel gas conditioning system.

Referring now to FIG. 4, an exemplary embodiment of a circulation heater system 200 includes a tubular housing 202 that defines a longitudinal passage 202a. Heating tubes, 204a and 204b, are positioned and supported within the passage 202a of the tubular housing 202. In an exemplary embodiment, the heating tube 204a extends through and is positioned within an upper portion of the inner tubular housing 202 and the heating tube 204b extends through and is positioned within a lower portion of the inner tubular housing 202.

A source 206 of an inlet stream of fluidic material is operably coupled to one end of the passage 202a by a conduit 208, and a conduit 210 is operably coupled to another end of the passage 202a for conveying fluidic materials from the other end of the passage into an outlet stream 212. In this manner, fluidic materials flow through the system 200 by entering one end of the passage 202a through the conduit 208, and exiting the other end of the passage 202a into the conduit 210 into an outlet stream 212.

In an exemplary embodiment, the source 206 of an inlet stream of fluidic material may, for example, include gaseous, liquid, ambient air, and/or natural gas materials and the outlet 212 may, for example, be used to provide a fuel source for a gas turbine.

In an exemplary embodiment, a controller 214 is operably coupled to the heating tubes, 210a and 210b, for controlling the operation of the heating tubes. In an exemplary embodiment, the controller 214 is further operably coupled to thermocouples, 216 and 218, that in turn are operably coupled to the fluidic materials within the conduits, 208 and 210. In this manner, the controller 214 may monitor the operating temperature of the fluidic materials within the conduits, 208 and 210. In an exemplary embodiment, the controller 214 is further operably coupled to pressure sensors, 220 and 222, that in turn are operably coupled to the fluidic materials within the conduits, 208 and 210. In this manner, the controller 214 may monitor the operating pressure of the fluidic materials within the conduits, 208 and 210. In an exemplary embodiment, the controller 214 is further operably coupled to a gas chromatograph 224 that in turn is operably coupled to the fluidic materials within the conduit 208. In this manner, the controller 214 may monitor the chemical composition of the fluidic materials within the conduit 208 and thereby also determine the specific heat $C_p$ of the fluid materials therein. In an exemplary embodiment, the controller 214 is further operably coupled to a power sensor 226 that in turn is operably coupled to the heating tubes, 204a and 204b, for monitoring the amount of power used by the heating tubes. In this manner, the controller 214 may monitor the amount of power used by the heating tubes, 204a and 204b.

In an exemplary embodiment, the specific heat $C_p$ of the fluid materials will typically vary as a function of the operating temperature of the fluidic materials. The variance in the specific heat $C_p$ of the fluid materials may be determined directly by the controller 214, using a conventional measuring device, and/or determined using a look up table stored in a memory device operably coupled to the controller.

In an exemplary embodiment, during operation of the circulation heater system 200, fluidic materials from the source 206 are conveyed into one end of the passage 202a by the conduit 208. Within the passage 202a, the fluidic materials are heated by their interaction with the heating tubes, 204a and 204b. As a result, the operating temperature of the fluidic materials at the end of the passage 202a are increased as they pass through the passage to the other end of the passage. The fluidic materials then exit the other end of the passage 202a and are conveyed to the outlet stream 212 by the conduit 210.

Figure 5:
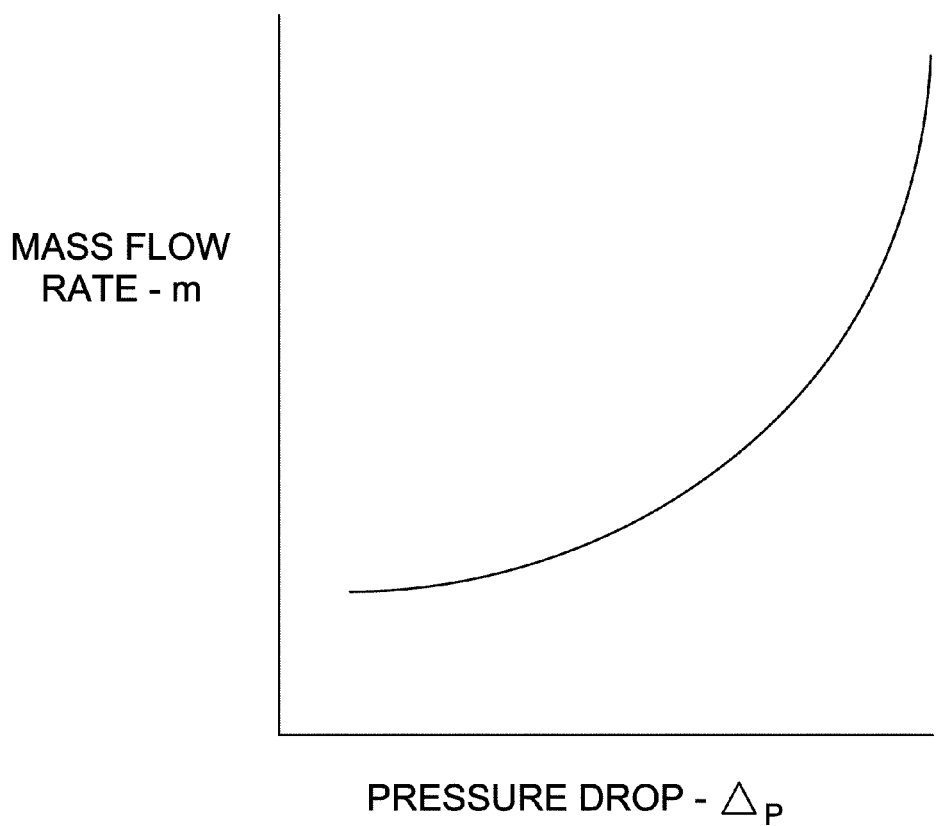
FIG. 5 is a graphical illustration of an exemplary embodiment of a look up table.

In an exemplary embodiment, during operation of the circulation heater system 200, the operating pressure at the inlet $P_{inlet}$ to the passageway 202a and the operating pressure at the outlet $P_{outlet}$ of the passageway 202a are determined by the controller 214 using the pressure sensors, 220 and 222, respectively. In an exemplary embodiment, the controller 214 then calculates the pressure drop $\Delta_P$ of the fluidic materials as they flow through the length of the passageway 202a. In an exemplary embodiment, as illustrated in FIG. 5, the controller 214 then determines the mass flow rate m of the fluidic materials through the passageway 202a using a look up table in which the mass flow rate m within the passageway 202a corresponding to a pressure drop $\Delta_P$ for a given set of operating conditions has been previously determined by calibration. In this manner, during operation of the circulation heater system 200, the controller 214 may determine the mass flow rate m of the fluidic materials through the passageway 202a. In an exemplary experimental embodiment, the mass flow rate m was found to be proportional to the square of the pressure drop $\Delta_P$.

In an exemplary embodiment, during operation of the circulation heater system 200, the operating temperature at the inlet $T_{inlet}$ to the passage 202a, the operating temperature at the outlet $T_{outlet}$ of the passageway 202a, the power Q supplied to the heating tubes, 204a and 204b, and the specific heat $C_P$ of the fluid materials conveyed into and through the passage 202a are determined by the controller 214 using the temperature sensors, 216 and 218, the power sensor 226, and the gas chromatograph 224. In an exemplary embodiment, the controller 214 then calculates the temperature drop $\Delta_T$ of the fluidic materials as they flow through the length of the passageway 202a. In an exemplary embodiment, the controller 214 may then determine the mass flow rate m of the fluidic materials through the passageway 202a using the following equation:

$$m = \frac{Q}{C_P * \Delta_T}$$

Where m=mass flow rate;
Q=power;
Cp=specific heat; and
$\Delta_T$=temperature drop.

Thus, in an exemplary embodiment, during operation of the circulation heater system 200, the controller 214 may determine the mass flow rate m of the fluidic materials through the passageway 202a by monitoring the pressure drop $\Delta_P$ of the fluidic materials as they flow through the length of the passageway 202a and/or by monitoring the temperature drop $\Delta_T$ of the fluidic materials as they flow through the length of the passageway 202a, the power Q supplied to the heating tubes, 204a and 204b, and the specific heat $C_P$ of the fluid materials conveyed into and through the passage 202a. In this manner, in an exemplary embodiment, the controller 214 may determine the mass flow rate m of the fluidic materials through the passage 202a using both of the above methods thereby providing a cross-checking of the determined mass flow rate for the fluidic materials through the passage 202a.

Figure 6:
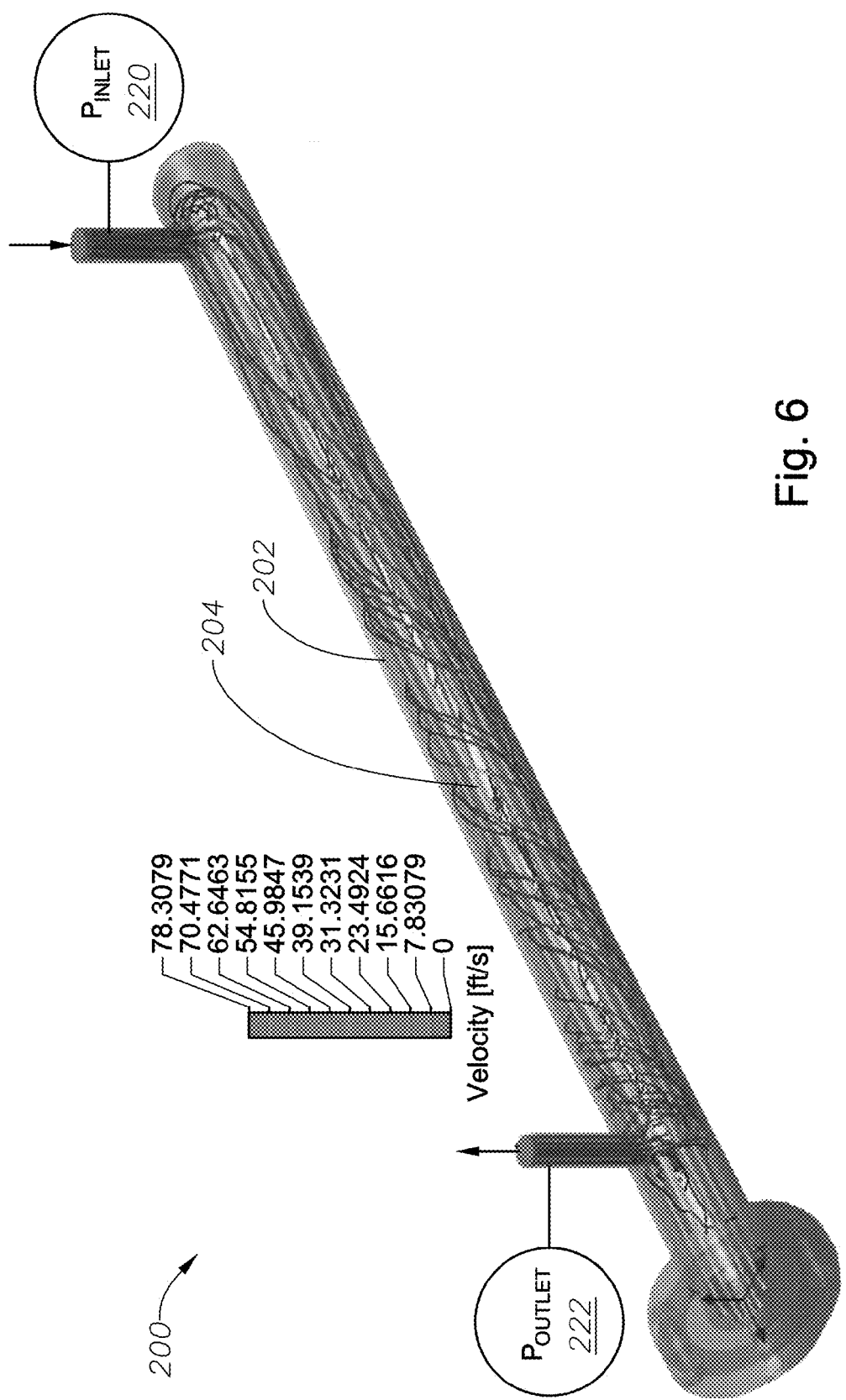
FIG. 6 is a schematic illustration of an exemplary experimental embodiment.
Figure 8:
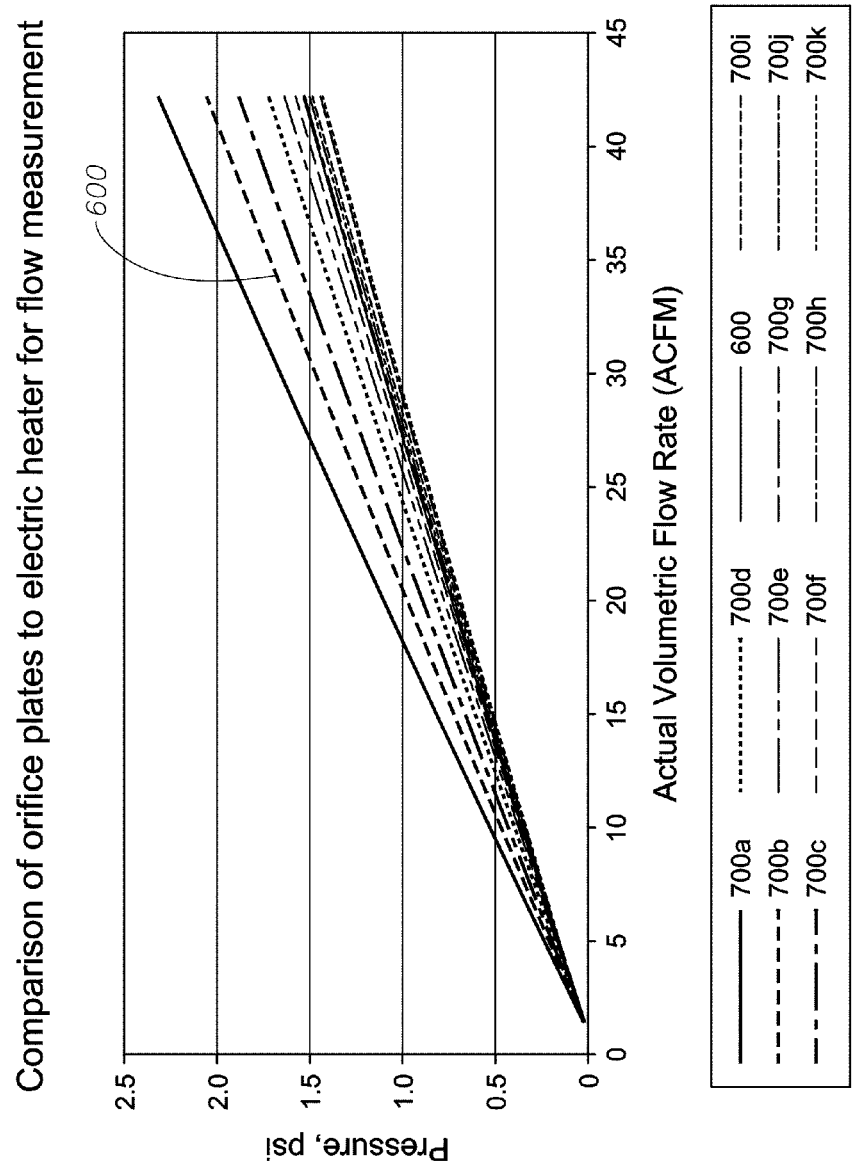
FIG. 8 is a graphical illustration of an exemplary experimental embodiment.

In an exemplary experimental embodiment, as illustrated in FIGS. 6 and 8, the relationship between the pressure drop and the volumetric flow rate through the tubular housing 202 of the circulation heater system 200, with heating elements 204 present, was performed which indicated that the relationship 600 between the pressure drop and the volumetric flow rate through the tubular housing was a linear relationship.

In an exemplary experimental embodiment, as illustrated in FIGS. 6 and 8, the relationship between the pressure drop and the volumetric flow rate through the tubular housing 202 of the circulation heater system 200, with heating elements 204 present, was performed which indicated that the relationship 600 between the pressure drop and the volumetric flow rate through the tubular housing was a linear relationship. This was an unexpected result.

Figure 7:
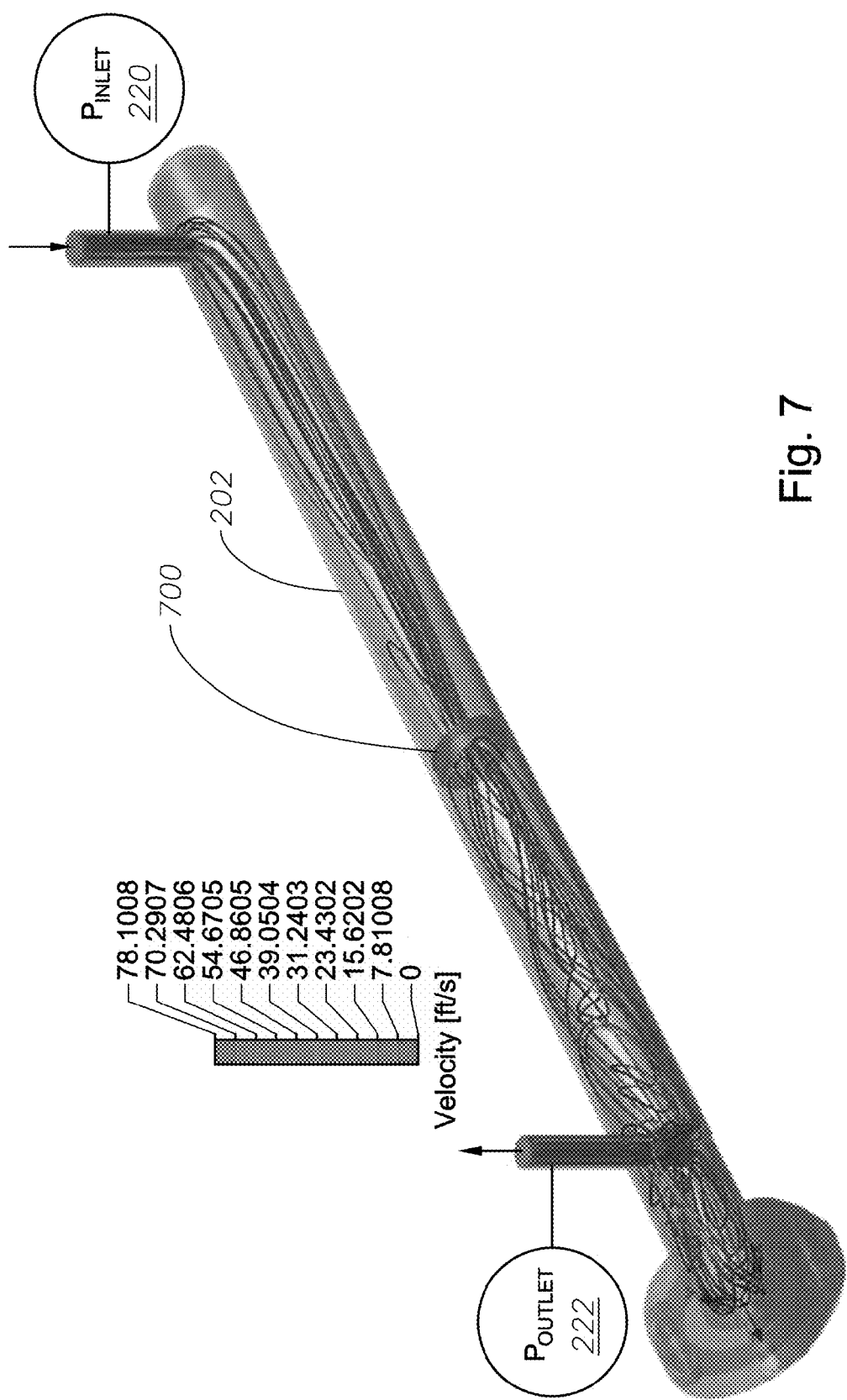
FIG. 7 is a schematic illustration of an exemplary experimental embodiment.

In an exemplary experimental embodiment, as illustrated in FIGS. 7 and 8, the circulation heater system 200 was modified by removing the heating elements 204 and placing different sized conventional orifice plates 700, one at a time, within the tubular housing 202, and then measuring the relationship between the pressure drop and the volumetric flow rate through the tubular housing 202. As a result, a series of curves, 700a-700k, corresponding to different sized orifice plates 700, were generated, which all demonstrated a linear relationship between the pressure drop and the volumetric flow rate through the tubular housing 202.

Thus, the exemplary experimental results demonstrated that: a) the relationship between the pressure drop and the volumetric flow rate through the tubular housing was a linear relationship for the circulation heater system 200; and b) the linear relationship between the pressure drop and the volumetric flow rate through the tubular housing was a linear relationship for the circulation heater system 200 was linear in same manner as that for a conventional orifice plate. These were unexpected results. Furthermore, the exemplary experimental results validated that the relationship between the pressure drop and the volumetric flow rate through the tubular housing for the circulation heater system 200 could be calibrated and then used during actual operation of the circulation heater system to provide a reliable and accurate measurement of the mass flow rate of fluidic materials through the tubular housing 202 of the circulation heater system.

An apparatus for conditioning feed gas has been described that includes an outer tubular housing; an inner tubular housing that defines a passageway positioned within the outer tubular housing, wherein an end of the passageway is adapted to be operably coupled to an outlet stream of fluidic materials; a plurality of spaced apart baffles positioned within the passageway of the inner tubular housing, wherein each baffle defines at least one passageway; one or more heating elements positioned within the passageway of the inner tubular housing, wherein each heating element extends through a corresponding passageway in each of the baffles; and an annular passageway defined between the inner and outer tubular housings, wherein an inlet of the annular passageway is adapted to be operably coupled to an input stream of fluidic material, and wherein an outlet of the annular passageway is operably coupled to another end of the passageway of the inner tubular housing. In an exemplary embodiment, the outer tubular housing ranges from 4 inch, schedule 40 pipe to 24 inch, schedule 40 pipe; and wherein the inner tubular housing ranges from 3 inch, schedule 10 pipe to 20 inch, schedule 10 pipe. In an exemplary embodiment, the outer tubular housing is fabricated from materials selected from the group consisting of low carbon steel, 304 stainless steel, and 304H stainless steel; and the inner tubular housing is fabricated from materials selected from the group consisting of H grade stainless steel, 316H stainless steel, and chromoly steel. In an exemplary embodiment, the spacing of the baffles in a longitudinal direction within the passageway of the inner tubular housing ranges from about 2 to 60 inches. In an exemplary embodiment, the spacing of the baffles in a longitudinal direction within the passageway of the inner tubular housing is about equal to the internal diameter of the inner tubular housing. In an exemplary embodiment, the internal diameters of the passageways of the baffles are greater than the external diameters of the corresponding heating elements. In an exemplary embodiment, the internal diameters of the passageways of the baffles are at least about 10% greater than the external diameters of the corresponding heating elements. In an exemplary embodiment, the number of heating elements ranges from about 3 to 180. In an exemplary embodiment, the average center-to-center spacing of the heating elements ranges from about 1 to 5 inches. In an exemplary embodiment, the outside diameter of the heating tubes are about 0.475 inches and the inside diameters of the passages, 214a and 216a, through the baffles, 214 and 216, are about $\frac{1}{16}^{th}$ to about $\frac{1}{4}^{th}$ of an inch larger.

A method for conditioning feed gas has been described that includes feeding an inlet stream of gas into an outer passageway in a first direction; then feeding the inlet stream of gas into an inner passageway in a second direction, in opposition to the first direction; heating the inlet stream of gas within the inner passageway; and impeding the flow of the inlet stream of gas within the inner passageway. In an exemplary embodiment, the method further includes heating the inlet stream of gas within the outer passageway. In an exemplary embodiment, the method further includes heating the inlet stream of gas within the outer passageway by transmitting heat from the inlet stream of gas within the inner passageway. In an exemplary embodiment, heating the inlet stream of gas within the inner passageway includes positioning a plurality of heating elements within the inner passageway. In an exemplary embodiment, impeding the flow of the inlet stream of gas within the inner passageway includes constricting the flow of the inlet stream of gas proximate the heating elements within the inner passageway. In an exemplary embodiment, impeding the flow of the inlet stream of gas within the inner passageway includes constricting the flow of the inlet stream of gas within the inner passageway.

An apparatus for conditioning a feed gas has been described that includes a tubular housing that defines a passageway, wherein an end of the passageway is adapted to be operably coupled to a source of fluidic materials; one or more heating elements positioned within the passageway of the tubular housing; a plurality of sensors operably coupled to the passageway; and a controller operably coupled to the sensors and the heating elements; wherein the sensors are adapted to generate one or more signals representative of one or more operating conditions; and wherein the controller is programmed to process the signals to generate a signal representative of a mass flow rate of the fluidic materials through the passageway. In an exemplary embodiment, wherein the sensors comprise a first pressure sensor for sensing an operating pressure of the fluidic materials at an inlet of the passageway; and a second pressure sensor for sensing an operating pressure at an outlet of the passageway. In an exemplary embodiment, wherein the sensors comprise a first temperature sensor for sensing an operating temperature of the fluidic materials at an inlet of the passageway; a second temperature sensor for sensing an operating temperature at an outlet of the passageway; a power sensor for sensing a power consumption by the heating elements; and a specific heat sensor for sensing a specific heat of the fluidic materials. In an exemplary embodiment, wherein the controller further comprises a look up table comprising data representative of a relationship between a pressure drop of the fluidic materials across the passageway and a mass flow rate of the fluidic materials. In an exemplary embodiment, the sensors comprise a first pressure sensor for sensing an operating pressure of the fluidic materials at an inlet of the passageway; a second pressure sensor for sensing an operating pressure at an outlet of the passageway; a first temperature sensor for sensing an operating temperature of the fluidic materials at an inlet of the passageway; a second temperature sensor for sensing an operating temperature at an outlet of the passageway; a power sensor for sensing a power consumption by the heating elements; and a specific heat sensor for sensing a specific heat of the fluidic materials. In an exemplary embodiment, the controller further comprises a look up table comprising data representative of a relationship between a pressure drop of the fluidic materials across the passageway and a mass flow rate of the fluidic materials.

A method for conditioning a feed gas has been described that includes feeding an inlet stream of gas into a passageway; heating the inlet stream of gas within the passageway; and determining a mass flow rate of the inlet stream of gas within the passageway. In an exemplary embodiment, the method further comprises sensing one or more operating conditions; and determining the mass flow rate of the inlet stream of gas using the sensed operating conditions. In an exemplary embodiment, the sensed operating conditions comprise a pressure drop of the inlet stream of gas within the passageway. In an exemplary embodiment, determining the mass flow rate of the inlet stream of gas within the passageway comprises looking up a relationship between the pressure drop of the inlet stream of gas within the passageway and a mass flow rate of the inlet stream of gas within the passageway. In an exemplary embodiment, the sensed operating conditions comprise a temperature drop of the inlet stream of gas within the passageway, a power consumption for the heating; and a specific heat of the inlet stream of gas. In an exemplary embodiment, the sensed operating conditions comprise a pressure drop of the inlet stream of gas within the passageway; a temperature drop of the inlet stream of gas within the passageway, and a power consumption for the heating; and a specific heat of the inlet stream of gas. In an exemplary embodiment, determining the mass flow rate of the inlet stream of gas within the passageway comprises looking up a relationship between the pressure drop of the inlet stream of gas within the passageway and a mass flow rate of the inlet stream of gas within the passageway.

A system for conditioning a feed gas has been described that includes means for feeding an inlet stream of gas into a passageway; means for heating the inlet stream of gas within the passageway; and means for determining a mass flow rate of the inlet stream of gas within the passageway. In an exemplary embodiment, the system further comprises means for sensing one or more operating conditions; and means for determining the mass flow rate of the inlet stream of gas using the sensed operating conditions. In an exemplary embodiment, the sensed operating conditions comprise a pressure drop of the inlet stream of gas within the passageway. In an exemplary embodiment, the means for determining the mass flow rate of the inlet stream of gas within the passageway comprises means for looking up a relationship between the pressure drop of the inlet stream of gas within the passageway and a mass flow rate of the inlet stream of gas within the passageway. In an exemplary embodiment, the sensed operating conditions comprise a temperature drop of the inlet stream of gas within the passageway, a power consumption for the heating; and a specific heat of the inlet stream of gas. In an exemplary embodiment, the sensed operating conditions comprise a pressure drop of the inlet stream of gas within the passageway; a temperature drop of the inlet stream of gas within the passageway, and a power consumption for the heating; and a specific heat of the inlet stream of gas. In an exemplary embodiment, the means for determining the mass flow rate of the inlet stream of gas within the passageway comprises means for looking up a relationship between the pressure drop of the inlet stream of gas within the passageway and a mass flow rate of the inlet stream of gas within the passageway.

An apparatus for heating fluidic materials has been described that includes a tubular housing that defines a passageway, wherein an end of the passageway is adapted to be operably coupled to a source of fluidic materials; one or more heating elements positioned within the passageway of the tubular housing; a plurality of sensors operably coupled to the passageway; and a controller operably coupled to the sensors and the heating elements; wherein the sensors are adapted to generate one or more signals representative of one or more operating conditions within the passageway; and wherein the controller is programmed to process the signals to generate one or more signals representative of a mass flow rate of the fluidic materials through the passageway. In an exemplary embodiment, the sensors comprise a first pressure sensor for sensing an operating pressure of the fluidic materials at an inlet of the passageway; and a second pressure sensor for sensing an operating pressure at an outlet of the passageway. In an exemplary embodiment, the sensors comprise a first temperature sensor for sensing an operating temperature of the fluidic materials at an inlet of the passageway; a second temperature sensor for sensing an operating temperature at an outlet of the passageway; a power sensor for sensing a power consumption by the heating elements; and a specific heat sensor for sensing a specific heat of the fluidic materials. In an exemplary embodiment, the controller further comprises a look up table comprising data representative of a relationship between a pressure drop of the fluidic materials across the passageway and a mass flow rate of the fluidic materials. In an exemplary embodiment, the sensors comprise a first pressure sensor for sensing an operating pressure of the fluidic materials at an inlet of the passageway; a second pressure sensor for sensing an operating pressure at an outlet of the passageway; a first temperature sensor for sensing an operating temperature of the fluidic materials at an inlet of the passageway; a second temperature sensor for sensing an operating temperature at an outlet of the passageway; a power sensor for sensing a power consumption by the heating elements; and a specific heat sensor for sensing a specific heat of the fluidic materials. In an exemplary embodiment, the controller further comprises a look up table comprising data representative of a relationship between a pressure drop of the fluidic materials across the passageway and a mass flow rate of the fluidic materials.

A method for heating fluidic materials has been described that includes feeding an inlet stream of fluidic materials into a passageway; heating the inlet stream of fluidic materials within the passageway; and determining a mass flow rate of the inlet stream of fluidic materials within the passageway. In an exemplary embodiment, the method further includes sensing one or more operating conditions; and determining the mass flow rate of the inlet stream of fluidic materials using the sensed operating conditions. In an exemplary embodiment, the sensed operating conditions comprise a pressure drop of the inlet stream of fluidic materials within the passageway. In an exemplary embodiment, determining the mass flow rate of the inlet stream of fluidic materials within the passageway comprises looking up a relationship between the pressure drop of the inlet stream of fluidic materials within the passageway and a mass flow rate of the inlet stream of fluidic materials within the passageway. In an exemplary embodiment, the sensed operating conditions comprise a temperature drop of the inlet stream of fluidic materials within the passageway, a power consumption for the heating; and a specific heat of the inlet stream of fluidic materials. In an exemplary embodiment, the sensed operating conditions comprise: a pressure drop of the inlet stream of gas within the passageway; a temperature drop of the inlet stream of gas within the passageway, and a power consumption for the heating; and a specific heat of the inlet stream of gas. In an exemplary embodiment, determining the mass flow rate of the inlet stream of gas within the passageway comprises looking up a relationship between the pressure drop of the inlet stream of gas within the passageway and a mass flow rate of the inlet stream of gas within the passageway.

A system for heating fluidic materials has been described that includes means for feeding an inlet stream of fluidic materials into a passageway; means for heating the inlet stream of fluidic materials within the passageway; and means for determining a mass flow rate of the inlet stream of fluidic materials within the passageway. In an exemplary embodiment, the system further includes means for sensing one or more operating conditions; and means for determining the mass flow rate of the inlet stream of fluidic materials using the sensed operating conditions. In an exemplary embodiment, the sensed operating conditions comprise a pressure drop of the inlet stream of fluidic materials within the passageway. In an exemplary embodiment, means for determining the mass flow rate of the inlet stream of fluidic materials within the passageway comprises means for looking up a relationship between the pressure drop of the inlet stream of fluidic materials within the passageway and a mass flow rate of the inlet stream of fluidic materials within the passageway. In an exemplary embodiment, the sensed operating conditions comprise a temperature drop of the inlet stream of fluidic materials within the passageway, a power consumption for the heating; and a specific heat of the inlet stream of fluidic materials. In an exemplary embodiment, the sensed operating conditions comprise: a pressure drop of the inlet stream of fluidic materials within the passageway, a temperature drop of the inlet stream of fluidic materials within the passageway, and a power consumption for the heating; and a specific heat of the inlet stream of fluidic materials. In an exemplary embodiment, means for determining the mass flow rate of the inlet stream of fluidic materials within the passageway comprises means for looking up a relationship between the pressure drop of the inlet stream of fluidic materials within the passageway and a mass flow rate of the inlet stream of fluidic materials within the passageway.

A method for determining a mass flow rate of fluidic materials while heating the fluidic materials, comprising: feeding an inlet stream of fluidic materials into a passageway; heating the inlet stream of fluidic materials within the passageway by positioning one or more heating elements within the passageway; sensing one or more operating conditions within the passageway; and determining the mass flow rate of the inlet stream of fluidic materials using the sensed operating conditions; wherein the sensed operating conditions comprise a pressure drop of the inlet stream of fluidic materials within the passageway; wherein the sensed operating conditions comprise a temperature drop of the inlet stream of fluidic materials within the passageway, a power consumption for the heating elements; and a specific heat of the inlet stream of fluidic materials; wherein determining the mass flow rate of the inlet stream of fluidic materials within the passageway comprises looking up a relationship between the pressure drop of the inlet stream of fluidic materials within the passageway and a mass flow rate of the inlet stream of fluidic materials within the passageway; and wherein determining the mass flow rate of the inlet stream of fluidic materials within the passageway comprises calculating the mass flow rate using the temperature drop of the inlet stream of fluidic materials within the passageway, the power consumption for the heating elements; and the specific heat of the inlet stream of fluidic materials.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Moreover, one or more aspects of one or more of the exemplary embodiments may be omitted or combined with one or more aspects of one or more other embodiments. Accordingly, the scope of protetion is not limited to the embodiments described, but is only limited by the claims that follow, the scope of which shall include all equivalents of the subject matter of the claims.

The invention claimed is:

1. An apparatus for heating fluidic materials, comprising:
   a tubular housing that defines a passageway, wherein an end of the passageway is adapted to be operably coupled to a source of fluidic materials;
   one or more heating elements positioned within the passageway of the tubular housing;
   a plurality of sensors operably coupled to the passageway; and
   a controller operably coupled to the sensors and the heating elements;
   wherein the sensors are adapted to generate one or more signals representative of one or more operating conditions within the passageway, and wherein the sensors comprise:
      a first pressure sensor for sensing an operating pressure of the fluidic materials at an inlet of the passageway,
      a second pressure sensor for sensing an operating pressure at an outlet of the passageway,
      a first temperature sensor for sensing an operating temperature of the fluidic materials at an inlet of the passageway,
      a second temperature sensor for sensing an operating temperature at an outlet of the passageway,
      a power sensor for sensing a power consumption by the heating elements, and
      a specific heat sensor for sensing a specific heat of the fluidic materials; and
   wherein the controller is programmed to process the signals to generate one or more signals representative of a mass flow rate of the fluidic materials through the passageway.

2. The apparatus of claim 1, further comprising one or more of:
   a specific heat sensor for sensing a specific heat of the fluidic materials; and
   a user input device for inputting a value for the specific heat of the fluidic materials.

3. The apparatus of claim 2, wherein the controller further comprises a look up table comprising data representative of a relationship between a pressure drop of the fluidic materials across the passageway and a mass flow rate of the fluidic materials.

4. The apparatus of claim 1, wherein the controller further comprises a look up table comprising data representative of a relationship between a pressure drop of the fluidic materials across the passageway and a mass flow rate of the fluidic materials.

5. The apparatus of claim 4, wherein the relationship between the pressure drop of the fluidic materials across the passageway and the mass flow rate of the fluidic materials comprises a linear relationship.

6. A system for heating fluidic materials, comprising:
   means for feeding an inlet stream of fluidic materials into a passageway;
   means for heating the inlet stream of fluidic materials within the passageway;
   means for determining a mass flow rate of the inlet stream of fluidic materials within the passageway; and
   means for sensing one or more operating conditions, the means for determining the mass flow rate of the inlet stream of fluidic materials using the sensed operating conditions, the sensed operating conditions comprising::
      a pressure drop of the inlet stream of fluidic materials within the passageway,
      a temperature rise of the inlet stream of fluidic materials within the passageway, and
      a power consumption for the heating, and
      a specific heat of the inlet stream of fluidic materials.

7. The system of claim 6, wherein means for determining the mass flow rate of the inlet stream of fluidic materials within the passageway comprises means for looking up a relationship between the pressure drop of the inlet stream of fluidic materials within the passageway and a mass flow rate of the inlet stream of fluidic materials within the passageway.

8. The system of claim 6, further comprising:
   means for determining a specific heat of the inlet stream of fluidic materials.

9. The system of claim 6, wherein means for determining the mass flow rate of the inlet stream of fluidic materials within the passageway comprises means for looking up a relationship between the pressure drop of the inlet stream of fluidic materials within the passageway and a mass flow rate of the inlet stream of fluidic materials within the passageway.

10. The system of claim 7, wherein the relationship between the pressure drop of the inlet stream of fluidic materials within the passageway and the mass flow rate of the inlet stream of fluidic materials within the passageway comprises a linear relationship.

11. The system of claim 6, wherein the means for determining the mass flow rate of the inlet stream of fluidic materials within the passageway comprises:

a first means for determining the mass flow rate of the inlet stream of fluidic materials within the passageway; and a second means for determining the mass flow rate of the inlet stream of fluidic materials within the passageway.

12. The system of claim 6, further comprising:

means for not heating the inlet stream of fluidic materials within the passageway.

13. The system of claim 6, wherein means for determining the mass flow rate of the inlet stream of fluidic materials within the passageway comprises:

means for determining the mass flow rate of the inlet stream of fluidic materials within the passageway using a first method; and means for determining the mass flow rate of the inlet stream of fluidic materials within the passageway using a second method;

wherein the first and second means for determining the mass flow rate of the inlet stream of fluidic materials within the passageway are different.

14. The system of claim 6, wherein means for determining the mass flow rate of the inlet stream of fluidic materials within the passageway comprises:

means for determining the mass flow rate of the inlet stream of fluidic materials within the passageway using a first method;

means for determining the mass flow rate of the inlet stream of fluidic materials within the passageway using a second method; and means for verifying the first method using the second method.

* * * * *